Aug. 18, 1925.

S. E. EHRICH 1,550,522

READING GLASS HOLDER

Filed Jan. 4, 1924     2 Sheets-Sheet 1

Simon E. Ehrich.
INVENTOR

BY Victor J. Evans.
ATTORNEY.

WITNESSES.

Aug. 18, 1925.

S. E. EHRICH
READING GLASS HOLDER
Filed Jan. 4, 1924

Simon E. Ehrich.
INVENTOR.
BY Victor J. Evans.
ATTORNEY.

Patented Aug. 18, 1925.

1,550,522

UNITED STATES PATENT OFFICE.

SIMON E. EHRICH, OF BRONX, NEW YORK.

READING-GLASS HOLDER.

Application filed January 4, 1924. Serial No. 684,405.

*To all whom it may concern:*

Be it known that I, SIMON E. EHRICH, a citizen of the United States, residing at Bronx, in the county of Bronx and State of New York, have invented new and useful Improvements in Reading-Glass Holders, of which the following is a specification.

This invention relates to reading glass holders and more particularly to holders for use upon computing scales.

The principal object of the invention is the provision of a reading glass holder which is universally adjustable so that the same may be accurately adjusted to focus the reading glass to suit the vision of the reader.

Another object of the invention is to provide a reading glass holder which is in the form of a bracket and which may be disconnected for shipping purposes so as to take up a minimum amount of space.

A still further object of the invention is to provide a reading glass holder which is simple in construction, cheap of manufacture or easy to apply or remove from a computing scale.

With these and other objects in view, the invention resides in certain novel construction and combination and arrangement of parts, the essential features of which are hereinafter fully described, are particularly pointed out in the appended claims, and are illustrated in the accompanying drawings, in which:—

Figure 1:
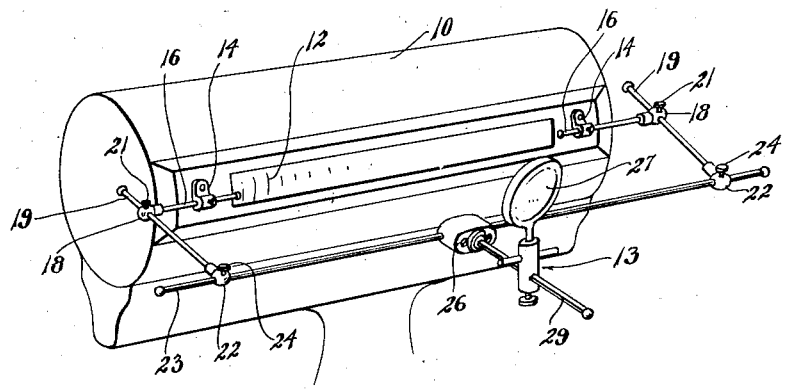
Figure 1 is a perspective view of my invention showing the same in use.
Figure 2:
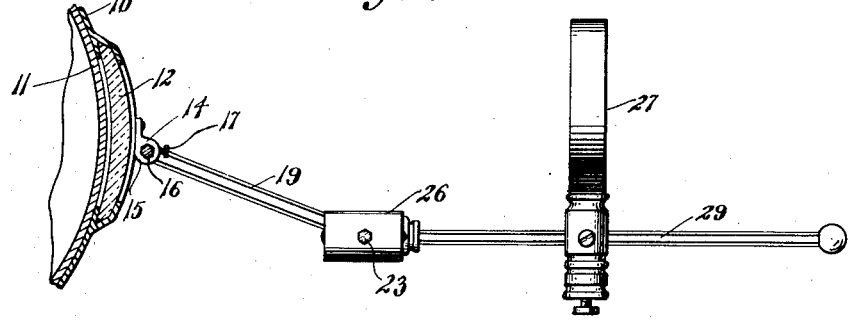
Figure 2 is a sectional view on the line 2—2 of Figure 1.
Figure 3:
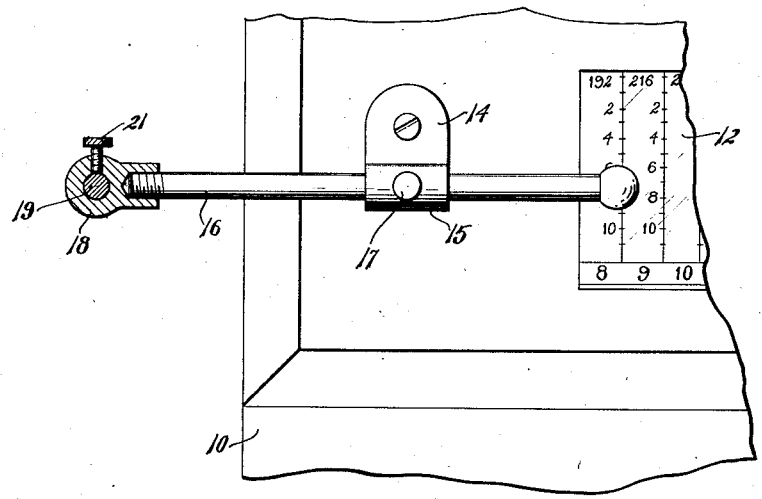
Figure 3 is a sectional view on the line 3—3 of Figure 1.

Referring more particularly to the drawing, the reference numeral 10 designates the casing of a portion of a computing scale, in which is mounted a revolvable barrel 11 upon which is inscribed, indicia for computing the prices of goods according to the weights. A window is provided in the front of the casing to expose a portion of the barrel 11, and said window is closed by a magnifying glass panel 12, whereby the indicia on the barrel when registering with the opening in the casing is magnified to render the same more visible to the reader.

It is to this type of device that my holder is primarily adapted for use but it is to be noted that the same may be used for various other purposes if desired without departing from the spirit of the invention.

My invention is shown in its entirety as at 13 and comprises a pair of attaching lugs 14 which are secured to the casing adjacent opposite ends of the magnifying panel or window. Each lug 14 is provided with a head 15, the said head having a bore through which trunnions 16 are adjustably supported. A set screw 16 holds each of the trunnions in their various positions of adjustment. One end of the trunnions 17 have a fitting 18 for adjustably receiving arms 19 which are supported at right angle to the axis of the trunnions. A set screw 21 secures each arm in its adjusted position. One end of each arm 19 is formed with a fitting 22 which supports a rod 23, one end of the rod passing through each fitting as clearly shown in Figure 1 of the drawing. The rod is held in adjusted position by means of set screws 24 similar to the set screws 21 above referred to.

Figure 4:
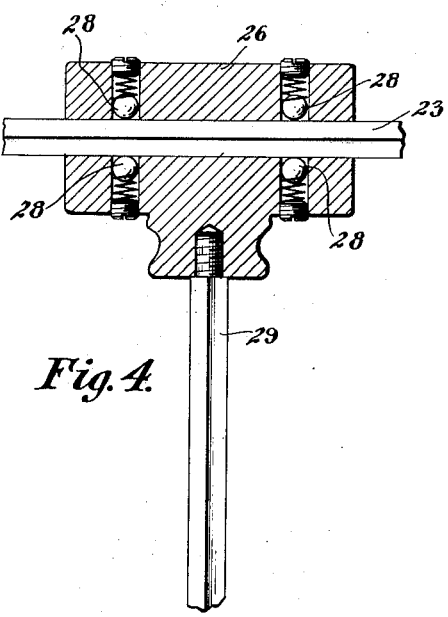
Figure 4 is a detail sectional view.

From the foregoing description, it will be seen that the rod 23 may be adjusted toward or away from the casing 10 by means of the set screws 21, and the same may also be adjusted radially with respect to the casing by means of the set screws 17. The rod 23 is of course adjustable longitudinally in the fittings 22 by means of the screws 24 so as to fit scales of various widths. In the present instance, the rod 23 is shown as hexagonal in cross section, and slidably mounted thereon is a support 26 for supporting a magnifying glass 27. The support 26 is held in its adjusted position along the rod 23 by means of friction set up by spring pressed balls 28 which co-act with the rod as clearly shown in Figure 4 of the drawing. The support 26 includes an arm 29 which also may be hexagonal in cross section and on which a magnifying glass is slidably mounted. The construction of the magnifying glass 27 is identical with that shown in my patent application Sr. No. 541,424, allowed August 2nd, 1923, and is capable of being applied to the arm without passing the same over the end. If desired the support 26 might be dispensed with and the magnifying glass 27 applied directly to the rod 23.

From the foregoing description, it will be manifest that the rod 23 may be adjusted toward or away from the reading indicia to obtain the approximate adjustment of the reading glass, after which the reading glass is adjusted along the arm 29 for a final adjustment whereby the exact focus is obtained for the eyes of different vision.

Figure 5:
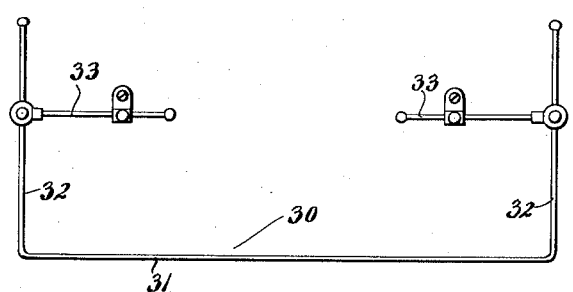
Figure 5 is a plan view of a modified form of my invention.

In Figure 5 there is shown a modification of my invention wherein the supporting bracket 30 is formed of a single piece of material and bent into U-shaped formation to include a longitudinal rod 31 and arms 32 bent at right angle to the rod 30. Trunnions 33 are provided and are similar to the ones in the preferred form so that the bracket may be adjusted toward or away from the indicia. Although certain of the rods are shown as hexagonal in cross section, I wish it to be understood that the same may be round and yet operate in an efficient manner.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A reading glass holder comprising a rod, adjustable arms carried by said rod, and extending at right angle to the axis of said rod, trunnions carried by said arms and adjustable thereon, lugs for attachment to a supporting structure and adapted to adjustably support said trunnions, and a reading glass adjustably mounted on said rod substantially as and for the purpose specified.

2. A reading glass holder comprising a rod, adjustable arms carried by said rod and extending at right angle to the axis of said rod, trunnions carried by said arms and adjustable thereon, lugs for attachment to a supporting structure and adapted to adjustably support said trunnions, and an arm slidably mounted on said rod between said first mentioned arms, and a reading glass adjustably mounted on said arm, as and for the purpose specified.

3. A reading glass holder for use in connection with computing scales comprising a rod, adjustable arms carried by said rod and extending at right angle thereto, attaching means carried by said arms and adjustable thereon and adapted to hold said rod at various distances from the support to which it is adapted to be attached, a reading glass, and means for adjustably mounting said reading glass upon said rod for focusing the same with respect to the supporting structure.

4. A reading glass holder for use in connection with computing scales comprising a rod, adjustable means carried by said rod and extending at right angle thereto, attaching means carried by said arms and adjustable thereon and adapted to hold said rod at various distances from the support to which it is adapted to be attached, a reading glass, and means for adjustably mounting said reading glass upon said rod for focusing the same with respect to the supporting structure, said last means including an arm slidable on said rod and adjustable radially thereon, and on which said reading glass is movably supported.

In testimony whereof I have affixed my signature.

SIMON E. EHRICH.